Oct. 8, 1935.  A. N. CRAMER  2,016,361
MACHINE FOR MAKING TUMBLERS
Filed April 3, 1934  6 Sheets-Sheet 1
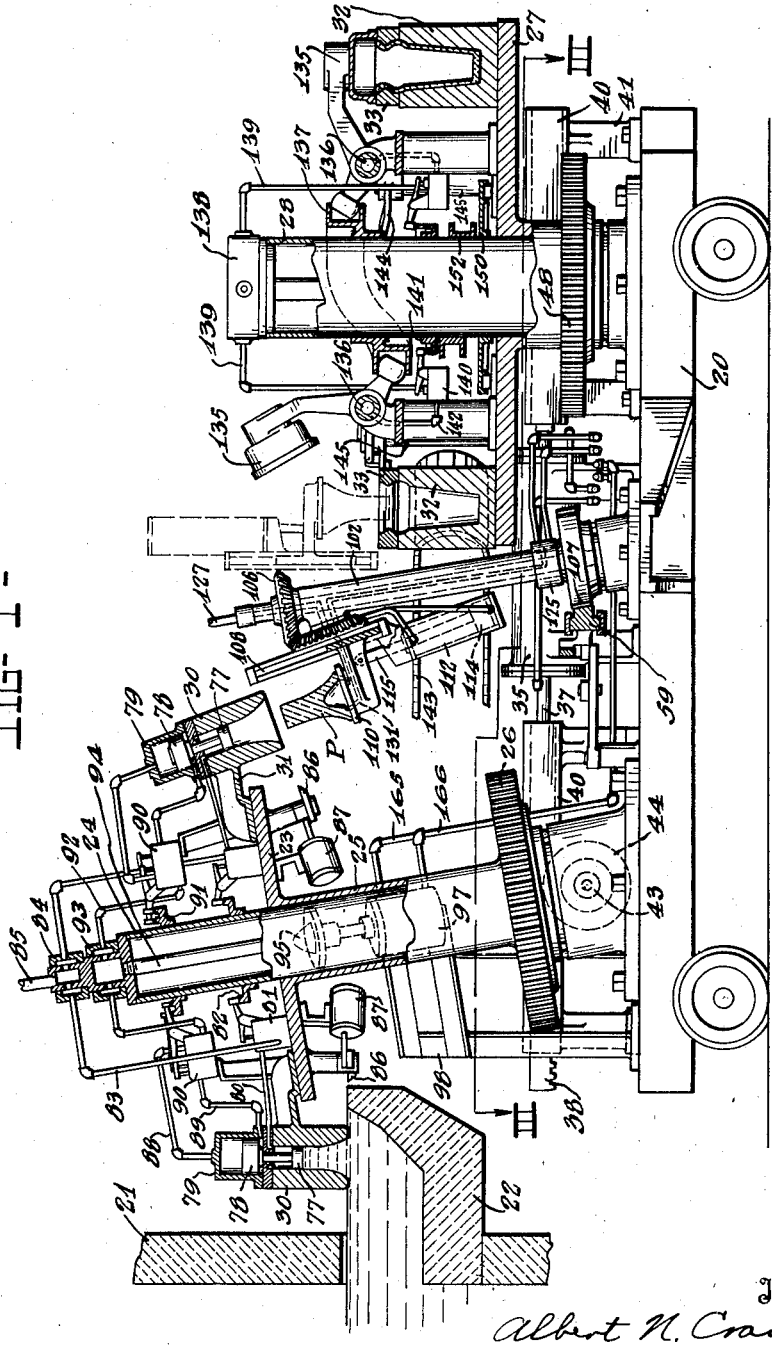
Inventor
Albert N. Cramer
By
J. F. Rule
Attorney Oct. 8, 1935.　　　　A. N. CRAMER　　　　2,016,361
MACHINE FOR MAKING TUMBLERS
Filed April 3, 1934　　　6 Sheets-Sheet 2
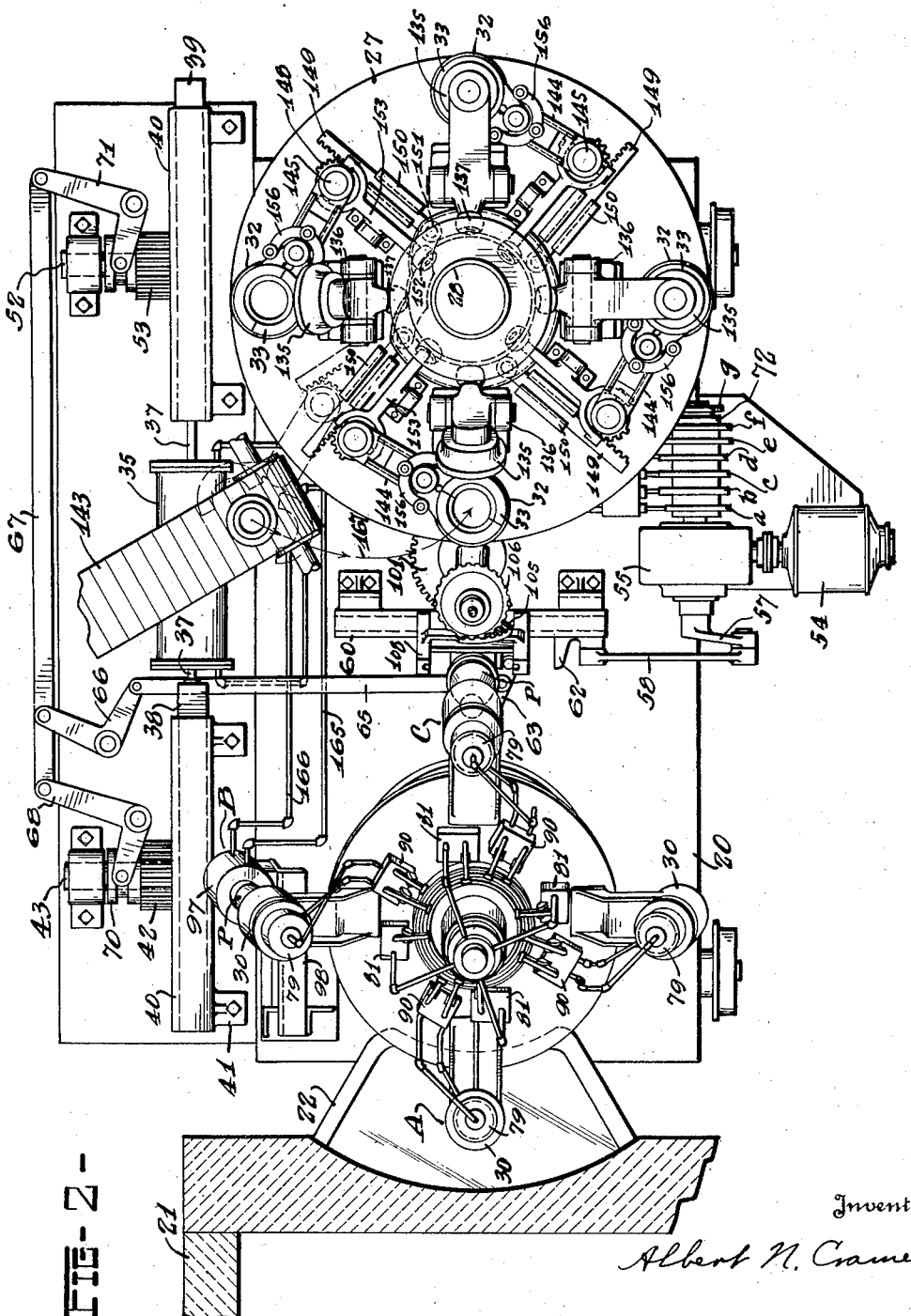
Inventor
Albert N. Cramer
By
J. F. Rule,
Attorney

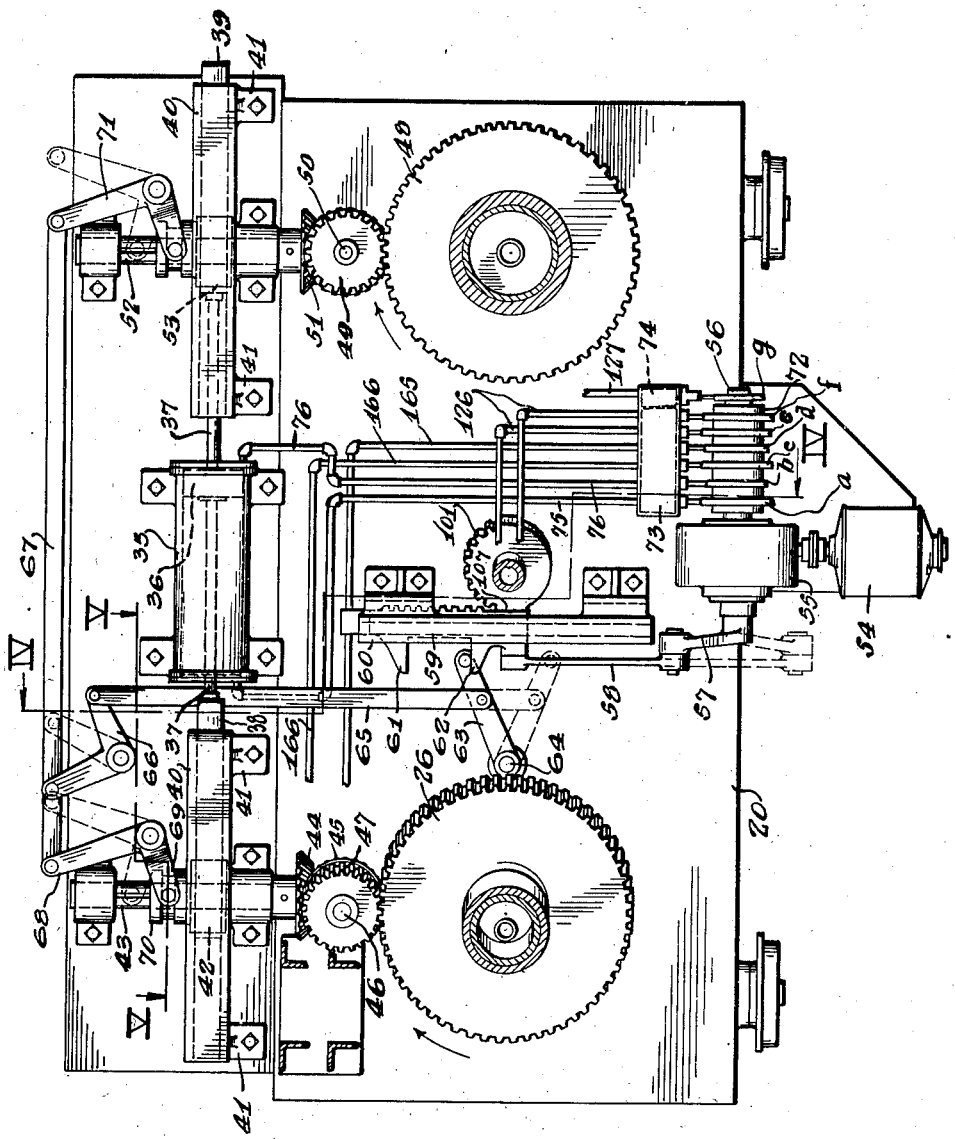

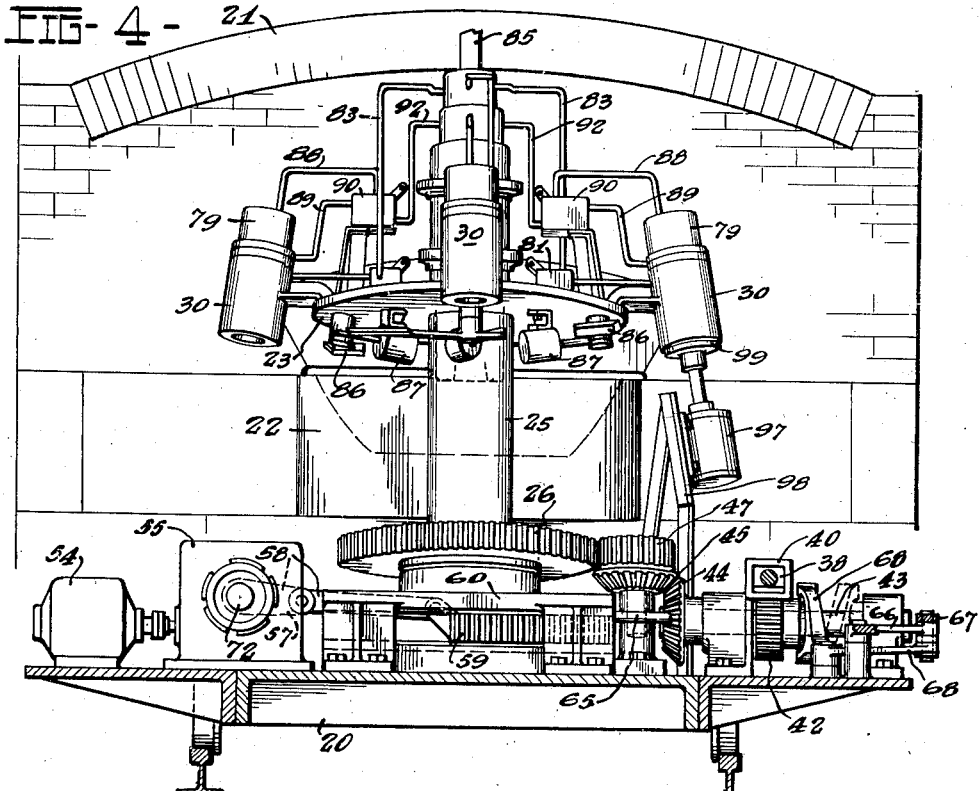
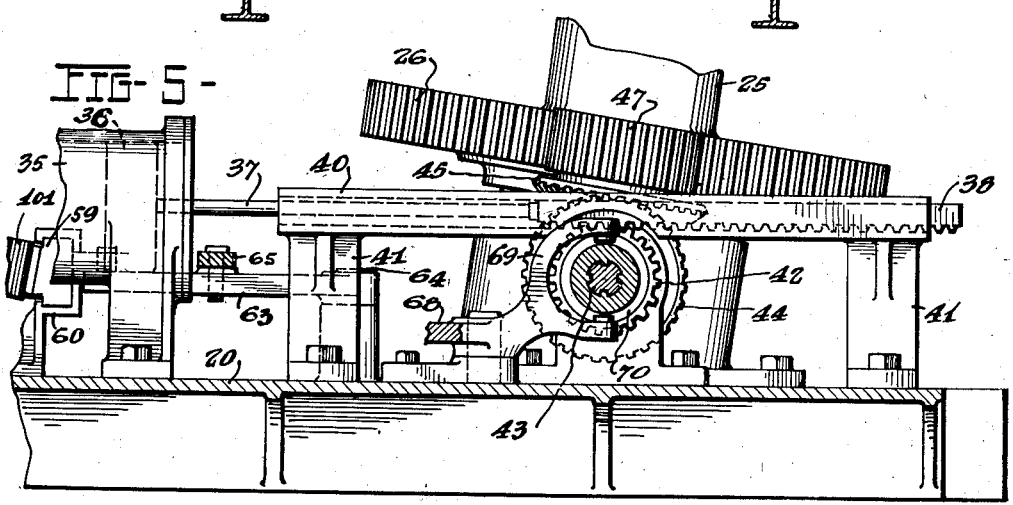

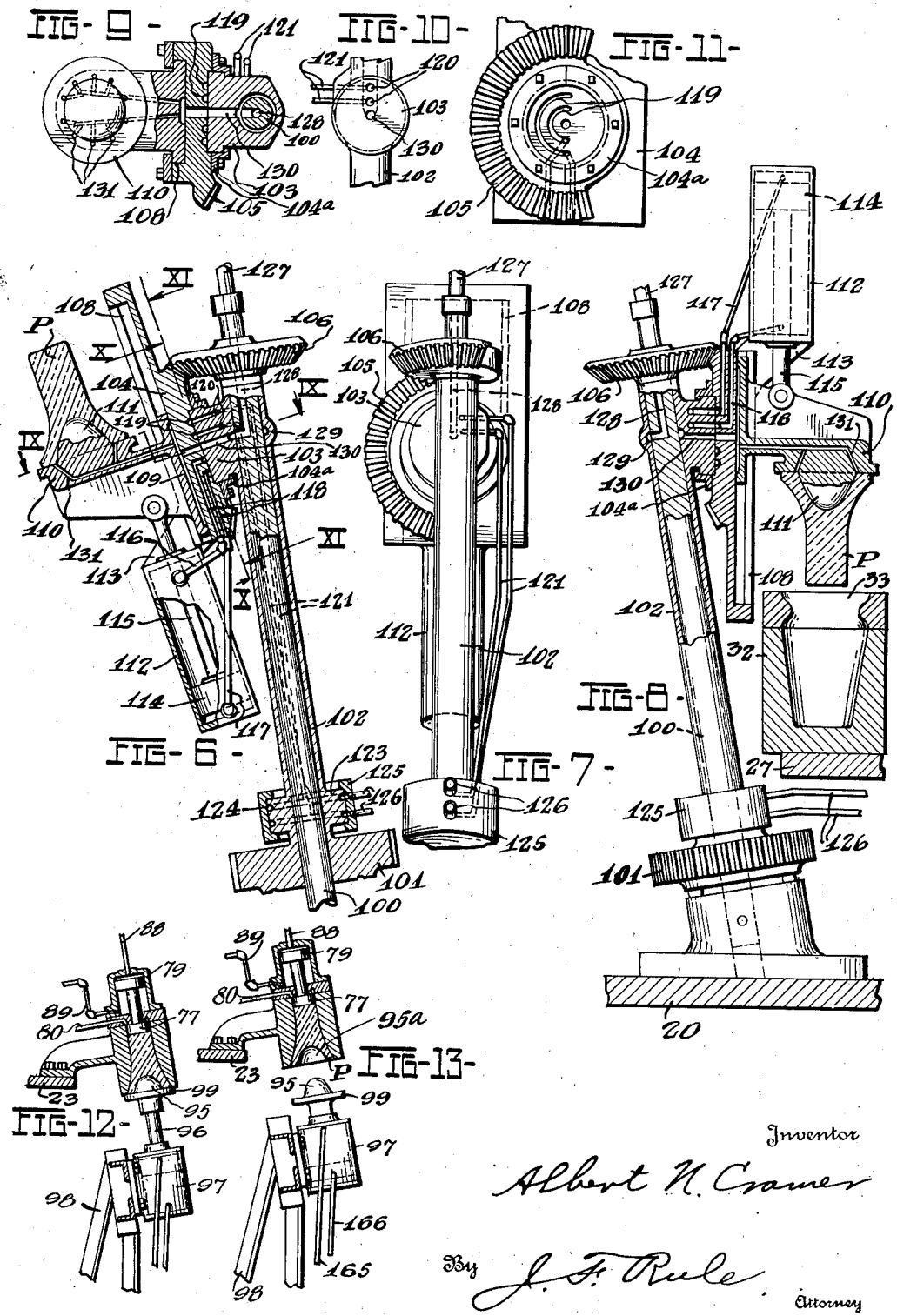

Oct. 8, 1935.  A. N. CRAMER  2,016,361
MACHINE FOR MAKING TUMBLERS
Filed April 3, 1934  6 Sheets-Sheet 6
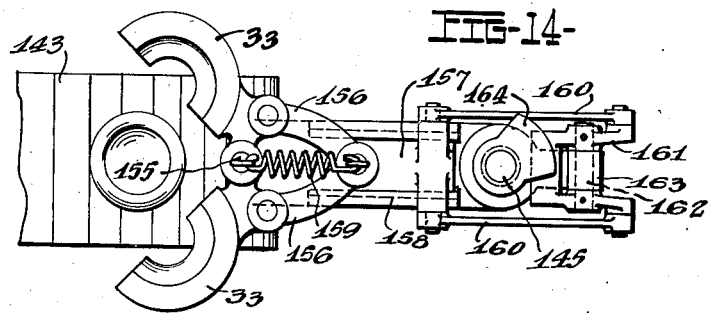
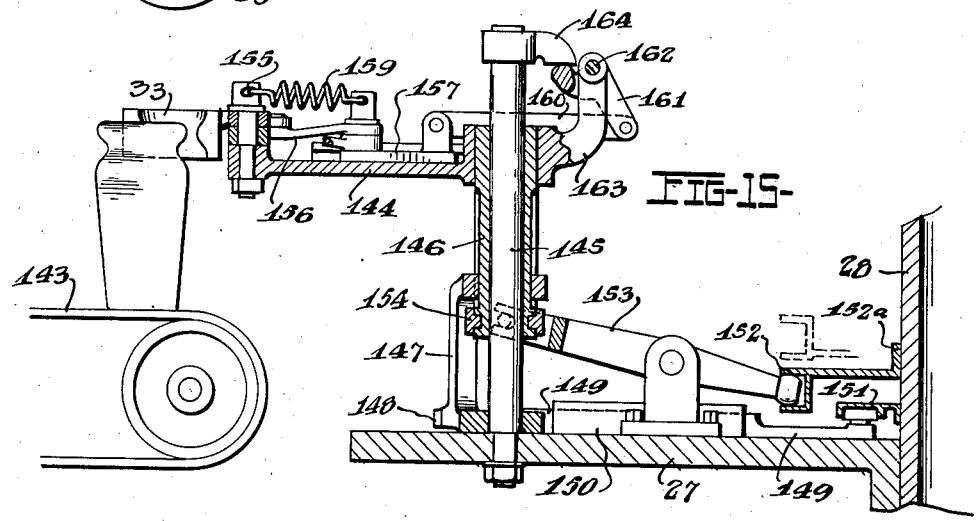
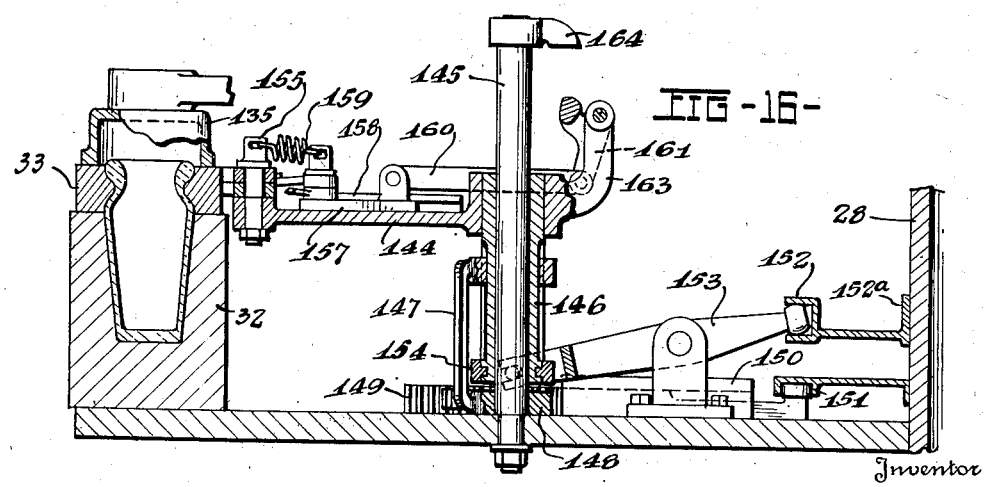
Inventor
Albert N. Cramer
By J. F. Rule
Attorney Patented Oct. 8, 1935

2,016,361

UNITED STATES PATENT OFFICE 2,016,361

MACHINE FOR MAKING TUMBLERS

Albert N. Cramer, Toledo, Ohio, assignor, by mesne assignments, to Owens-Illinois Glass Company, Toledo, Ohio, a corporation of Ohio Application April 3, 1934, Serial No. 718,814

48 Claims. (Cl. 49—9)

My invention relates to machines for making tumblers and other hollow molded glassware. In its preferred form, the invention is embodied in a two-table machine of the suction gathering type comprising a rotating parison mold table on which are mounted parison molds brought by the rotation of the table to position for gathering charges of glass by suction from a supply body of molten glass, and a rotating finishing mold table spaced laterally from the parison mold table and carrying finishing molds to which the parisons are transferred from the parison molds.

In machines of the suction gathering type, much difficulty has been experienced in connection with the cut-off scar formed in the parison when the mold charge is severed from the supply body of glass, the scar appearing as a defect in the finished ware. Various expedients have heretofore been resorted to in an effort to eliminate or reduce such scars to a minimum, but not with entire success.

An object of the present invention is to provide practical means for entirely overcoming the above noted difficulty. To this end the invention provides a construction and arrangement of parts by which the mold charge or parison is severed at that end thereof which later is cracked off from the blown article and returned as cullet to the furnace for reheating, thus removing the scar carrying portion so that there is no possibility of the scar appearing in the finished article.

A further object of the invention is to provide a machine in which both the parison molds and the finishing molds maintain a fixed position relative to the mold carriages, together with novel means for transferring the parisons, thereby eliminating the usual mechanism for opening, closing and shifting the molds relatively to their carriages and thus permitting a greatly simplified construction.

Other objects of the invention will appear hereinafter.

Referring to the accompanying drawings:

Fig. 1 is a sectional side elevation of a machine constructed in accordance with my invention.

Fig. 2 is a top plan view of the machine.

Fig. 3 is a sectional plan view, the section being taken at the line III—III on Fig. 1.

Fig. 4 is a front sectional elevation at the line IV—IV on Fig. 3.

Fig. 5 is a sectional elevation at the line V—V on Fig. 3.

Fig. 6 is a sectional side elevation of the parison transfer mechanism.

Fig. 7 is a front elevation of the same.

Fig. 8 is a part sectional view similar to Fig. 6, but showing the parts in a different relative position.

Fig. 9 is a section at the line IX—IX on Fig. 6.

Fig. 10 is a detail view as indicated by the section line X—X on Fig. 6.

Fig. 11 is a view taken at the plane of the line X—X, but viewed in the opposite direction as indicated by the section line arrows XI—XI on Fig. 6.

Figs. 12 and 13 are detail sectional views showing the press plunger mechanism for pressing and shaping the blank in the parison mold. Fig. 12 shows the plunger projected and Fig. 13 shows it withdrawn.

Figs. 14 to 16 illustrate the take-out mechanism by which the finished articles are taken from the finishing molds and transferred to a conveyor. Fig. 14 is a plan view of such mechanism, showing the relative position of the parts just after an article has been released to the conveyor. Fig. 15 is a sectional elevation of the same. Fig. 16 is a view similar to Fig. 15, but showing the parts before the article is removed from the finishing mold.

Referring particularly to Figs. 1 to 5, the machine is mounted on a wheeled base or platform 20, permitting it to be moved toward and from a furnace 21. A continuous supply of molten glass is maintained in the forehearth extension 22 which presents an exposed gathering area from which the molds gather their charges by suction. A parison mold table or carriage 23 is mounted for rotation on a stationary center column 24 which has a fixed mounting on the base 20 and rises therefrom in a direction inclined toward the furnace. The mold table 23 is mounted for rotation about the axis of the column 24, said table having a tubular downward extension 25 surrounding said column and provided at its lower end with a gear wheel 26.

An annular series of blank or parison molds 30 have a fixed mounting on the table 23, being attached thereto as by means of bracket arms 31. The rotation of the mold table 23 about its inclined axis causes the parison molds to travel in an angular path which is also perpendicular to said axis. The axes of the parison molds are preferably somewhat inclined to the plane of the mold table, said axes being downwardly and outwardly inclined with respect to the axis of the mold table so that when a mold is in charge gathering position over the pool of glass its axis is vertical. When the mold is at the transfer station, at the opposite side of the mold table, its axis is inclined to the vertical, the angle of inclination being double that of the center column 24.

A finishing mold table or carriage 27 is mounted for rotation about a vertical cylindrical column 28 having a fixed mounting on the platform 20. Mounted on the finishing mold table 27 is an annular series of finishing or blow molds 32 each comprising a solid or one piece body mold and a split ring mold or mold section 33 positioned over and in register with the body mold, the section 33 serving as a transfer ring in the manner hereinafter described.

The mold carriages are given an intermittent or step-by-step rotation about their respective axes by means of an air driven piston motor 35 operating through mechanism which will now be described. The motor comprises a piston 36 and a piston rod 37 extending through both ends of the motor cylinder and having attached at its opposite ends, rack bars 38 and 39 which reciprocate in stationary guideways 40 carried on brackets 41 bolted to the platform 20. The rack 38 meshes with and drives a pinion 42 splined on a shaft 43 extending transversely of the rack. A bevel pinion 44 keyed to the inner end of the shaft 43 runs in mesh with a bevel gear 45 on a shaft 46 to which is also attached a pinion 47 running in mesh with the gear 26.

Driving connections between the rack 39 and the finishing mold carriage 27, comprise a gear 48 fixed to the carriage 27 and rotatable about the axis of the column 28. A pinion 49 running in mesh with the gear 48, is mounted on a shaft 50 which also carries a bevel gear running in mesh with a bevel pinion 51 on a horizontal shaft 52 on which is splined a gear 53 in mesh with and driven by the rack 39.

The gears 42 and 53 are periodically shifted lengthwise of their respective shafts into and out of mesh with the racks 38 and 39 by the following mechanism: A continuously running electric motor 54 (see Figs. 2 and 3) has a driving connection through reduction gearing in a gear box 55, with a shaft 56 on which is keyed a crank 57. The crank is connected through a link 58 with a rack bar 59 mounted to reciprocate in guides 60. The rack bar is provided with lugs 61 and 62 adapted to engage a pin on a rock arm 63 and rock the arm about its fulcrum 64. A link 65 connects the rock arm 63 with one arm of a bell crank 66, the other arm of which is pivotally connected to a rod 67 extending parallel with the rack bars 38 and 39. The rod 67 is connected at one end to an arm of a bell crank lever 68, the other arm of which is in the form of a yoke 69 which embraces a hub 70 formed on the gear 42 and has an operating connection therewith so that movement of the bell crank 68 about its fulcrum moves the gear 42 lengthwise of its shaft into and out of mesh with the rack 38. A similar connection including a bell crank lever 71, is provided between the gear 53 and rod 67.

When the parts are in the position shown in full lines in Fig. 3, the racks 38 and 39 are in mesh with the pinions 42 and 53. While the parts are thus positioned, air under pressure is admitted to the right hand end of the motor cylinder 35, thereby driving the piston 36 to the left so that the racks 38 and 39 operate through the gear trains above described to rotate the gears 26 and 48 through an angle of 90°, thereby imparting a step rotation to the two mold carriages. After this movement of the mold carriages is completed, the lug 61 on the reciprocating rack bar 59 engages the rock arm 63 and moves it to the dotted line position (Fig. 3). The rod 67 is thereby moved to the right and operates through the bell cranks 68 and 71 to shift the gears 42 and 53 out of mesh with the racks 38 and 39. The motor piston 36 is now moved in the reverse direction, thereby returning the racks 38 and 39 preparatory to another indexing movement. After the racks have been thus returned, the lug 62 operates to return the rock arm 63 and again bring the gears into mesh with the racks 38 and 39.

A timer 72 (Figs 2 and 3) comprises a cylinder mounted to rotate with the shaft 56 and carrying a series of cams a, b, c, d, e, f and g which operate valves within a valve box comprising an air pressure chamber 73 and a vacuum chamber 74. The cams a and b operate valves which control the supply of air under pressure through pipes 75 and 76 to the ends of the motor cylinder 35.

Each step rotation of the parison mold carriage 23 brings a mold 30 into a charge gathering position over the forehearth 22, with the lower open end of the mold in sealing contact with the pool of glass. Within each parison mold is a plunger 77 connected to a piston 78 which is movable up and down within the cylinder of an air motor 79 which may have a fixed mounting on the mold. While the mold is in its charge gathering position, the plunger 77 is in its lowered position as shown in Fig. 1. The air is now exhausted from the mold cavity through a vacuum pipe 80 opening into the mold above the plunger 77. As the plunger has a loose fit in the mold cavity the air therebeneath is withdrawn so that the mold cavity beneath the plunger is filled with glass by suction. The suction line 80 extends to a valve box 81 in which is a valve actuated by a cam 82 on the column 24. The vacuum line extends from the valve box 81 through a pipe 83 to a vacuum distributing head 84 which communicates with a conduit 85 connected to a source of vacuum.

After the mold has received its charge it is lifted above the level of the pool of glass by the rotation of the mold carriage. A knife 86 actuated by an air motor 87 then operates to sever the glass. After the glass is severed the piston 78 is moved upward, thereby drawing the plunger 77 upward and causing the charge of glass to be moved upward in the mold by atmospheric pressure. Air under pressure for lifting and lowering the piston 78 is supplied through pipes 88 and 89 leading to the upper and lower ends, respectively, of the cylinder, said pipes extending to a valve box 90 in which are valves controlled by stationary cams on a cam ring 91 mounted on the column 24. Air pressure lines 92 extend from the valves boxes 90 to a distributing head 93 to which air under pressure is supplied through a pipe 94 extending downward through the column 24.

Each step rotation of the parison mold carriage carries a parison mold with its charge from a charging station A to a pressing station B where the glass parison is compacted in the mold by a press plunger (see Figs. 12 and 13). The plunger comprises a head 95 carried on a stem or piston rod 96 of a piston motor 97. The motor cylinder has a stationary mounting on a frame 98 carried on the platform 20. When a mold is brought to the station B the motor 97 operates to project the press plunger upward to the Fig. 12 position, thereby causing the plunger head to engage the lower, reentrant end surface of the parison and compress the glass within the mold. The plunger head is formed with a disk or flange 99 which forms a temporary mold bottom and seats on the lower end of the mold. If desired, air pressure may be admitted to the upper end of the motor cylinder 79 while the plunger is in its mold closing position (Fig. 12) thereby applying downward pressure to the plunger 77 which cooperates with the press plunger 95 to compact and shape the glass in the mold cavity. The lower portion of the mold cavity as shown, is downwardly and outwardly flared so that the mold in cooperation with the press plunger and the plunger 77, forms an outwardly flared, bell shaped lower end on the inverted parison, with a blow opening 95a therein. After the pressing operation the press plunger is withdrawn to the Fig. 13 position, leaving the mold free to advance with the mold carriage during the next indexing operation which brings the mold to a transfer station C between the mold carriages.

The parison transfer mechanism includes a stationary inclined shaft or post 100 having a fixed mounting on the base 20. The shaft 100 is preferably parallel with the inclined column 24. Mounted for oscillation on the shaft 100 is a segmental gear 101 attached to or formed integral with a tubular shaft 102 surrounding the shaft 100. The shaft 102 has attached thereto or formed integral therewith adjacent its upper end a bearing block 103 having a flat circular face inclined to the axis of the shaft. A parison inverting and transfer head 104 is mounted on the block 103 for oscillation about the axis of said block through an arc of substantially 180° for swinging the inverted parison carried thereby to an upright position during the transfer operation, as more fully set forth hereinafter. The inverting head is held on the block 103 by a split bearing ring 104a. Said head is formed with a gear segment 105 on its inner face which meshes with a stationary segmental gear 106 fixed to the upper end of the shaft 100.

The gear 101 is oscillated by the rack 59 which is reciprocated in the manner heretofore described. As shown in Fig. 3, the rack while at the end of its travel is in engagement with a flat face 107 on the gear 101 so that the latter is held stationary during a predetermined interval after each reciprocating movement, permitting the parison to be transferred from the parison mold to the head 104 and from said head to the finishing mold while the gear 101 is held stationary. During the rotation of the gear 101 in one direction and with it the bearing block 103, the head 104 is rotated about the axis of the block 103 owing to the travel of the gear segment 105 along the stationary gear segment 106.

The inverting head 104 is formed with guideways 108 in which a slide plate 109 is mounted for up and down sliding movement. The slide plate comprises a bracket extension formed with a circular supporting plate 110 on which the parison is supported during the transfer, said plate 110 being formed with a dome 111 corresponding in shape to the recess 95a in the parison and adapted to enter said recess. The slide plate 109 is reciprocated on the inverting head by means of a piston motor 112 comprising a cylinder attached by a bracket 113 to the inverting head. The motor includes a piston 114 and piston rod 115, the latter connected to the slide plate 109.

The piston motor 112 is actuated by air under pressure, under the control of the timer 72. The air lines extending from the motor cylinder to the valve box 73 include pipes 116 and 117 opening into the opposite ends of the motor cylinder. The air lines are continued from said pipes through passageways 118 extending through the inverting head to arc-shaped channels 119 formed in the inner face of said head. The channels 119 are in communication with passageways 120 which extend through the bearing block 103 to pipes 121 connected to rotate with the tubular shaft 102. Said pipes extend downward to an annular enlargement or head 123 on the shaft 102 and open into annular channels 124 formed in the periphery of said head. A stationary collar 125 surrounding the head 123 provides a support for pipes 126 which communicate with the channels 124. The pipes 126 extend to the valve box 73. The supply of air to the pipes 126 is controlled by the timer cams e and f.

The parison P is held by suction on the supporting plate 110 during the inverting and transfer movements. The suction is applied through a vacuum pipe 127 connected to the upper end of the post 100. The vacuum line extends downward through a passageway 128 in the post, said passageway opening into a channel 129 formed in and extending circumferentially of the tubular shaft 102. The channel 129 opens into a passageway 130 extending centrally through the block 103 and the inverting head 104. The vacuum line is continued through the slide plate 109 to an annular series of vacuum ports 131 opening through the face of the supporting plate 110, said ports surrounding the dome 111. The vacuum pipe 127 is in constant communication with the suction ports 131 through the passageways just described, and extends to the vacuum valve box 74. The air exhaustion through the vacuum line is controlled by the timer cam g which actuates the valve in the suction chamber 74 for periodically connecting the pipe 127 with a source of vacuum.

Blow heads 135 individual to the finishing molds are mounted on the carriage 27 to swing up and down about the axes of their pivot shafts 136 under the influence of a stationary cam track 137 mounted on the column 28. When the blow head 135 is swung down and seats on the mold, air under pressure is supplied therethrough for expanding the parison to final form. The air is supplied from a suitable source through a distributing head 138 mounted to rotate on the upper end of the column 28. Pipes 139 lead from the distributing head to valve boxes 140 in which are valves controlled by a stationary cam 141. The air pressure lines may be continued from the valve boxes through pipes 142 which open into the hollow pivot shafts 136 and through the hollow arms carrying the blow heads.

The blown articles are removed from the finishing molds and transferred to a conveyor 143 (Fig. 2) by means of transfer devices individual to the finishing molds. The transfer devices, one of which is shown in detail in Figs. 14, 15 and 16, are in the main of substantially the same construction and operate in the same manner as the transfer devices disclosed in my copending application Serial Number 701,108, filed December 6, 1933. Each transfer device comprises a horizontally disposed transfer arm 144 mounted for up and down movement on a post 145 and also for horizontal oscillation about the axis of said post. The post has a fixed mounting on the mold table 27. The arm 144 has a fixed connection to a bearing sleeve 146 which is mounted to oscillate on the post 145 and is also slidable up and down thereon. Means for oscillating the arm 144 includes a yoke 147 which has a fixed connection at its lower end with a pinion 148 mounted to oscillate on the shaft 145. The upper end of the yoke 147 has a splined connection with the sleeve 146, permitting the latter to move up and down in the yoke but causing the sleeve to turn with the yoke when the latter is rocked or oscillated about the axis of the post.

Rocking movement is imparted to the yoke by means including a rack 149 in mesh with the pinion 148, said rack mounted to reciprocate in a guide 150. The rack is actuated by a stationary cam 151 on the column 28. A cam track 152 on a cam plate 152ª controls the up and down movements of the transfer arm through mechanism including a lever 153, one end of which carries a roll running on the track 152 and the other end of which is in the form of a yoke straddling a collar 154 and having a slot and pin connection therewith. Said collar is mounted on the lower end of the sleeve 146, the latter being free to rotate in the collar.

The transfer ring 33 comprises sections which swing about a pivot pin 155 at the outer end of the arm 144. Links 156 connect the ring sections to a slide plate 157 mounted on the arm 144 to reciprocate longitudinally thereof in guides 158. The sections of the ring 33 are held together by a coil spring 159 anchored at one end to the slide plate 157 and at its other end to the pivot pin 155. A pair of links 160 are pivoted at their opposite ends, respectively, to the slide plate 157 and to a yoke 161 having a horizontal pivot pin 162 at the upper end of an arm 163 extending upwardly from the transfer arm 144. A stop 164 fixed to the upper end of the post 145 is positioned in the path of the inner end of said yoke and engages the latter when the arm 144 is lifted as shown in Fig. 15, thereby rocking the yoke 161, and through the links 160, moving the slide 157 against the tension of the spring 159, thereby opening the ring 33.

The operation of the machine is as follows: The continuously running motor 54 (Fig. 3) operates the timer 72 for effecting the periodic and synchronized operation of the several air motors controlled thereby. These include the piston motor 35 controlled by the timer cams a and b so that said motor periodically reciprocates the racks 38 and 39, thereby rotating the mold carriages step-by-step in the manner heretofore described. Each step rotation of the parison mold carriage brings a parison mold to the charging position (Fig. 1) and a charge of glass is drawn therein by suction. The application of suction is controlled by the cam 82 on the center column of the mold carriage.

As the mold travels in an inclined path it is lifted above the glass as it moves beyond the gathering area. The knife 86 then severs the glass. This severance takes place during the first step rotation of the mold beyond the gathering point, which step brings the mold to station B where it is brought to rest above the press plunger 95 (Figs. 12 and 13). When or before the mold reaches this station, the plunger 77 in the mold is drawn upwardly by the air motor 79 under the control of the stationary cam 91 on the column 24, thereby drawing the parison upwardly in the mold and forming a recess or concavity in the lower end of the parison. At station B the plunger 95 is projected upward into engagement with the mold, thereby shaping and compressing the parison, the movement of the plunger being effected by the air motor 97 under the control of the timer cams c and d. These cams operate valves in the valve box 73 for supplying air under pressure to pipes 165 and 166 leading to the upper and lower ends of the motor 97. The press plunger is withdrawn while the mold is at rest at station B.

The next step rotation of the mold carriage brings the mold to the transfer station C. When the parison mold comes to rest at the transfer station, the parison transfer mechanism (Figs. 6 to 11) operates as follows to transfer the parison to the finishing mold. The piston motor 112 first operates to project the slide 109 upward, bringing the supporting plate 110 against the bottom of the mold with the dome 111 projecting into the parison. The operation of the motor 112 is under the control of the timer cams e and f. As soon as the plate 110 contacts with the mold, suction is applied at the annular series of ports 131 for holding the parison to the said plate. This application of suction is controlled by the timer cam g, as heretofore described. The motor 112 is immediately reversed and withdraws the parison P downward out of the mold, this movement being in a straight line in the direction of the axis of the mold. Concomitantly with this downward movement of the parison, the plunger 77 within the mold may be moved downward by its air motor 79 under the control of the cam 91, thereby assisting in expelling the parison and preventing distortion thereof.

When the parison has been withdrawn thus from the mold, the hollow shaft 102 is rotated about the post 100 through a half revolution by means of the rack 59 (Fig. 3) operating as heretofore described. This rotation causes the gear segment 105 running on the fixed gear segment 106 to rotate the parison inverting and transfer head 104 about the axis of its bearing block 103 so that said head and the parison thereon are inverted and at the same time carried to the opposite side of the post 100. This brings the parison to the upright or suspended position shown in Fig. 8 with the parison directly above a finishing mold 32. The motor 112 now operates to lower the slide block while the parison is held thereon by suction, thus lowering the parison into the finishing mold. The suction is now broken, thereby releasing the parison to the finishing mold. The rack bar 59 (Fig. 3) now operates to rotate the shaft 102 in the reverse direction, thereby reinverting the transfer head and bringing it back to the Fig. 6 position ready for the next transfer operation. These transfer movements take place while the mold carriages remain at rest, during which period the motor 35 imparts the idle or return movement to the racks 38 and 39.

During the next step rotation of the mold carriages, a blowing head 135 (Fig. 1) is moved downward onto the mold which has just received the parison, this movement being controlled by the cam track 137. The cam 141 on the column 28 now opens a valve in box 140 to supply air to the blow head for expanding the parison in the finishing mold. This air pressure may be maintained, if desired, until the mold has made two or more step rotations beyond the transfer station. Before the takeout position is reached the air pressure is discontinued and the blow head 135 lifted from the mold. After this the takeout mechanism operates to take the blown article from the blow mold and transfer it to the conveyor 143.

The operation of the takeout mechanism (see Figs. 2, 14, 15, 16) is as follows: The cam 152 operates through the lever 153 to lift the takeout arm 144 and transfer ring 33 to a position in which the blown article carried in the ring clears the mold 32. The cam 151 then operates the rack 149 to rock the transfer arm and swing the suspended article outwardly to a position over the conveyor 143. The cam 152 now operates to give a final upward movement to the transfer arm, thereby bringing the yoke 161 against the stop 164 so that the latter operates to swing said yoke about its pivot 162 and move the slide 157 inwardly to open the ring 33, thus releasing the blown article which drops onto the conveyor 143. The movements of the transfer arm are then reversed, thereby closing the ring 33 and returning it into register with its mold ready to receive a succeeding parison. The path of the ring 33 from the article discharging position to the parison receiving position is indicated by the line of arrows 167 (Fig. 2).

After the blown article is removed from the machine the upper end portion thereof which has been formed in the ring mold 33 is cracked off and the rim of the article fire finished in the usual manner. It will be noted that the cut-off scar produced by the operation of the knife 86 is at the end of the parison which is later formed in the ring 33 and therefore in the portion of glass which is cracked off and discarded so that there is no possibility of the cutoff scar showing as a defect in the finished article.

Modifications may be resorted to within the spirit and scope of my invention.

I claim:

1. Apparatus for forming hollow glass articles comprising, in combination, a parison mold open at one end to receive a charge of glass, means for introducing the charge into the mold through said open end, means for extending the mold cavity and causing a portion of the charge to enter said extension and thereby form an initial blow opening in the glass at said end of the mold, a finishing mold, means for transferring the parison to the finishing mold, and means for blowing the parison in the finishing mold.

2. A machine for forming hollow glass articles comprising a parison mold open at one end thereof, means for introducing glass by suction into the mold through said open end, means for extending the mold cavity and causing a portion of the charge to enter said extension and thereby form an initial blow opening in the parison at said open end of the mold, a finishing mold, and means for transferring the parison thereto and blowing it therein.

3. A machine for forming hollow glass articles comprising a parison mold open at one end thereof, means for introducing glass by suction into the mold through said open end, a press plunger, means for operating the plunger and causing it to press the glass in the mold and shape an initial blow opening in the parison at said open end of the mold, and mechanism for applying a yielding pressure to the glass at the opposite end of the mold during said operation of the press plunger.

4. Apparatus for forming hollow glass articles comprising, in combination, a parison mold open at one end to receive a charge of glass, means for introducing the charge into the mold through said open end, means for extending the mold cavity and causing a portion of the charge to enter said extension and thereby form an initial blow opening in the glass at said end of the mold, a finishing mold open at one end, means for transferring the parison from the parison mold and introducing it lengthwise into the finishing mold with said initial blow opening at said open end of the mold, and means for blowing the parison in the finishing mold.

5. The combination of a mold open at one end thereof to receive a charge of glass, a plunger movable lengthwise within the opposite end portion of the mold, a press plunger operable to form an initial blow opening in the glass at said open end of the mold, and means for actuating said plungers and causing them to compress the glass in the mold and form a parison therein.

6. The combination of a mold open at one end thereof to receive a charge of glass, a plunger movable lengthwise within the opposite end portion of the mold, a press plunger operable to form an initial blow opening in the glass at said open end of the mold, means for actuating said plungers and causing them to compress the glass in the mold and form a parison therein, a finishing mold, means for transferring the parison to the finishing mold, and means for expanding it in the finishing mold.

7. The combination of a vertically disposed parison mold having a mold cavity opening downward through the lower end of the mold, means for introducing a charge of glass by suction into the mold through said open end, a plunger movable up and down in the upper portion of the mold cavity, means for severing a charge of glass at the lower end of the mold while said plunger is in its downward position, means for then moving the plunger upwardly and drawing the glass upward in the mold, a press plunger, means for causing it to enter the lower end of the mold, compress the glass and shape an initial blow opening in the glass, a finishing mold, means for transferring the parison thereto, and means for blowing the parison in the finishing mold.

8. The combination of a vertically disposed parison mold having a mold cavity opening downward through the lower end of the mold, means for introducing a charge of glass by suction into the mold through said open end, a plunger movable up and down in the upper portion of the mold cavity, means for severing a charge of glass at the lower end of the mold while said plunger is in its downward position, means for then moving the plunger upwardly and drawing the glass upward in the mold, a press plunger, means for causing it to enter the lower end of the mold, compress the glass and shape an initial blow opening in the glass, a finishing mold open at one end to receive the parison, means for introducing the parison lengthwise into the finishing mold with said initial blow opening at said open end thereof, and means for applying air under pressure to the parison through said open end of the finishing mold and thereby expanding the parison.

9. The combination of a mold carriage, a mold thereon open at its lower end, means for forming a parison in the mold, means for rotating the mold carriage and thereby bringing the mold to a discharging position, means for discharging the parison from the mold by a downward movement of the parison through the lower open end of the mold, means separate from the mold carriage for inverting the bare parison, and means for blowing the parison to form a finished article.

10. The combination with a container for molten glass, of a mold carriage, a mold thereon open at its lower end, means for rotating the mold carriage about an axis positioned laterally beyond the container and thereby bringing the mold alternately to a charging position over the glass in the container and a discharging position, means for introducing a charge of molten glass into the mold through its lower end while in said charging position and forming a parison therein, means for discharging the parison from the mold in a downward direction while at said discharging position, means separate from the mold carriage for inverting the bare parison, and means for blowing the parison to form a finished article.

11. The combination with a container for molten glass, of a mold carriage, a mold thereon open at its lower end, means for rotating the mold carriage about an axis positioned laterally beyond the container and thereby bringing the mold alternately to a charging position over the glass in the container and a discharging position, means for introducing a charge of glass into the mold by suction while at said charging position, means for severing the glass at the lower open end of the mold, a plunger separate from the mold carriage and operating upwardly through said lower open end of the mold while the glass is in the mold for compacting the glass and forming an initial blow opening therein, and means for discharging the glass downwardly through said open end of the mold at said discharging position.

12. The combination with a container for molten glass, of a mold carriage, a mold thereon open at its lower end, means for rotating the mold carriage about an axis positioned laterally beyond the container and thereby bringing the mold alternately to a charging position over the glass in the container and a discharging position, means for introducing a charge of glass into the mold by suction while at said charging position, means for severing the glass at the lower open end of the mold, means for discharging the parison downwardly through said lower end of the mold, a finishing mold open at its upper end to receive the parison, and parison inverting and transfer mechanism separate from the said mold carriage and operable to receive the parison from the parison mold, invert it and transfer it to the finishing mold.

13. The combination of a mold carriage, an annular series of parison molds having a fixed mounting on the carriage, each said mold being open at one end thereof, means for rotating the carriage and thereby bringing the molds to charge receiving and discharging positions, means for introducing charges of molten glass into the molds through said open ends when at the charge receiving position and forming parisons in the molds, and suction means for engaging the parisons while in the molds and withdrawing the parisons lengthwise from the molds through said open ends while at the discharging position.

14. The combination with a container for molten glass, of a mold carriage, a mold thereon, means for rotating the mold carriage about an axis positioned laterally of the container and thereby bringing the mold periodically and alternately to a charging position over the glass in the container and a discharging position beyond said container, said mold having its axis substantially vertical when at the charging position, means for introducing charges of glass by suction into the mold through the lower end thereof while in said charging position, means for severing the charges in the mold from the glass in the container, means for discharging the parisons downwardly from the mold while at said discharging position, and means intermediate said charging and discharging positions for compacting the glass in the mold, said compacting means including a plunger movable upwardly to project into the mold and shaped to form an initial blow opening in the parison at said open end of the mold, and means for applying a yielding downward pressure to the glass in the mold while said plunger is projected into the mold.

15. The combination with a container for molten glass, of a mold carriage, a mold thereon, means for rotating the mold carriage about an axis positioned laterally of the container and thereby bringing the mold periodically and alternately to a charging position over the glass in the container and a discharging position beyond said container, said mold having its axis substantially vertical when at the charging position, means for introducing charges of glass by suction into the mold through the lower end thereof while in said charging position, means for severing the charges in the mold from the glass in the container, means for discharging the parisons downwardly from the mold while at said discharging position, means intermediate said charging and discharging positions for compacting the glass in the mold, said compacting means including a plunger movable upwardly to project into the mold and shaped to form an initial blow opening in the parison at said open end of the mold, an upright finishing mold open at its upper end, and parison transfer mechanism including means for engaging the parison while in the parison mold and withdrawing it therefrom, inverting it and introducing it downwardly into the finishing mold, and means for blowing the parison in the finishing mold.

16. A machine for forming hollow glass articles comprising a parison mold table, parison molds thereon, means for rotating said table about a stationary axis, a finishing mold table positioned laterally beyond the parison mold table and in a plane below the parison mold table, finishing molds on the finishing mold table, means for rotating said tables and bringing the molds to a transfer station, and transfer mechanism at said station including means for withdrawing parisons downwardly out of the parison molds and introducing them in a downward direction into the finishing molds.

17. A machine for forming hollow glass articles comprising a parison mold table, parison molds thereon, means for rotating said table about a stationary axis, a finishing mold table positioned laterally beyond the parison mold table and in a plane below the parison mold table, finishing molds on the finishing mold table, means for rotating said tables and bringing the molds to a transfer station, and parison transfer mechanism operable to engage a parison in a parison mold at the lower end thereof, withdraw the parison downwardly from the parison mold, invert the parison, position it over the finishing mold and lower it into the finishing mold.

18. The combination of a parison mold, means for forming a parison therein, a finishing mold, means for automatically bringing said molds to a parison transfer station with the parison mold opening downwardly and the finishing mold opening upwardly, and automatic mechanism for transferring a parison comprising means for withdrawing the parison downwardly from the parison mold, inverting it and introducing it into the finishing mold through the upper open end thereof.

19. The combination of a parison mold open at its lower end, a finishing mold open at its upper end, means for forming a parison in the parison mold, and means for transferring the parison including a support movable into engagement with the parison in the parison mold, suction means for holding the parison on said support, means for moving said support downward and thereby withdrawing the parison from the parison mold, means for inverting said support and bare parison and positioning the parison over the finishing mold, means for lowering said support and thereby lowering the parison into the finishing mold, and means for then releasing the parison from said support.

20. The combination of a parison mold open at one end, means to position the mold with said end down and the axis of the mold cavity inclined to the vertical, an upright finishing mold open at its upper end, and parison transfer mechanism operable to withdraw a parison downward out of the parison mold in the direction of said inclined axis, invert the parison, position it over the finishing mold and move it vertically downward into the finishing mold.

21. In a glass forming apparatus, a parison transfer mechanism comprising a shaft mounted to rotate about an axis inclined to the vertical, a parison inverting and transfer head carried on said shaft and mounted to rotate about an axis arranged at an angle to said inclined axis, a parison supporting plate carried on said head, means for rotating said shaft and thereby rotating said head about the axis of said shaft, and automatic means for rotating said inverting head about its own axis during its rotation about the axis of said shaft and thereby inverting a parison carried by said plate.

22. In a glass forming apparatus, a parison transfer mechanism comprising a shaft mounted to rotate about an axis inclined to the vertical, a parison inverting and transfer head carried on said shaft and mounted to rotate about an axis arranged at an angle to said inclined axis, a parison supporting plate carried on said head, means for rotating said shaft and thereby rotating said head about the axis of said shaft, automatic means for rotating said inverting head about its own axis during its rotation about the axis of said shaft and thereby inverting a parison carried by said plate, and means for moving said plate up and down on said inverting head.

23. Parison transfer mechanism comprising a shaft mounted to rotate about an inclined axis, a bearing block on said shaft, a parison inverting and transfer head mounted on said bearing block for rotation about an axis extending transversely of said shaft, a parison support carried on said head, means for rotating said shaft, and means controlled by the rotation of said shaft for rotating said head about its axis and thereby inverting a parison carried on said support during the rotation of the latter about the axis of said shaft.

24. Parison transfer mechanism comprising a shaft mounted to rotate about an inclined axis, a bearing block on said shaft, a parison inverting and transfer head mounted on said bearing block for rotation about an axis extending transversely of said shaft, a parison support carried on said head, means for rotating said shaft, means controlled by the rotation of said shaft for rotating said head about its axis and thereby inverting a parison carried on said support during the rotation of the latter about the axis of said shaft, and means operable while said shaft is stationary for moving said support up and down on said transfer head.

25. Parison transfer mechanism comprising a shaft mounted to rotate about an inclined axis, a bearing block on said shaft, a parison inverting and transfer head mounted on said bearing block for rotation about an axis extending transversely of said shaft, a parison support carried on said head, means for rotating said shaft, and means controlled by the rotation of said shaft for rotating said head about its axis and thereby inverting a parison carried on said support during the rotation of the latter about the axis of said shaft, the inclination of said axes being such that the parison support is swung from an inclined position while at one side of the axis of said shaft to a horizontal position when at the opposite side of said axis.

26. In a machine for forming hollow glass articles, the combination of a mold carriage, a mold thereon having a vertically disposed mold cavity opening through the lower end of the mold, the lower portion of the walls of the mold cavity being downwardly and outwardly flared, means for introducing a charge of molten glass through said lower open end of the mold, means for severing the glass at said end, and means for enlarging the mold cavity and causing a portion of the severed glass to enter the enlargement and thereby cause the formation of an initial blow opening in the parison at said lower end of the mold.

27. In a machine for forming hollow glass articles, the combination of a mold carriage, a mold thereon having a vertically disposed mold cavity opening through the lower end of the mold, the lower portion of the walls of the mold cavity being downwardly and outwardly flared, means for introducing a charge of molten glass through said lower open end of the mold, means for severing the glass at said end, means for enlarging the mold cavity, and means for compressing glass in the mold including a plunger movable upwardly to enter the mold and form an initial blow opening in the glass at said open end of the mold.

28. In a machine for forming hollow glass articles, the combination of a mold carriage, a mold thereon having a vertically disposed mold cavity opening through the lower end of the mold, the lower portion of the walls of the mold cavity being downwardly and outwardly flared, means for introducing a charge of molten glass through said lower open end of the mold, means for severing the glass at said end, means for enlarging the mold cavity and causing a portion of the severed glass to enter the enlargement and thereby cause the formation of an initial blow opening in the parison at said lower end of the mold, a finishing mold open at one end to receive the parison, and means for withdrawing the parison from the parison mold through said open end thereof and introducing it into the finishing mold through the open end of the latter.

29. A machine for forming hollow glass articles comprising a parison mold carriage, parison molds thereon, a finishing mold carriage, finishing molds thereon, said carriages being positioned side by side, means for rotating the carriages about laterally spaced axes and thereby bringing the molds in synchronism to a transfer station between said axes, said parison molds having downwardly opening mold cavities, said finishing molds having upwardly opening mold cavities, and parison transfer mechanism having a stationary mounting between the mold carriages and including means for withdrawing the parisons downwardly from the parison molds and introducing them downwardly into the finishing molds.

30. A machine for forming hollow glass articles comprising a parison mold carriage, parison molds thereon, a finishing mold carriage, finishing molds thereon, said carriages being positioned side by side, means for rotating the carriages about laterally spaced axes and thereby bringing the molds in synchronism to a transfer station between said axes, said parison molds having downwardly opening mold cavities, said finishing molds having upwardly opening mold cavities, and parison transfer mechanism having a stationary mounting between the mold carriages and including means for withdrawing the parisons downwardly from the parison molds, inverting the bare parisons and lowering the inverted parisons into the finishing molds.

31. The method of forming a hollow glass article which comprises introducing a charge of molten glass into a parison mold through an open end thereof, extending the mold cavity and causing a portion of the charge to enter said extension and reshape the charge to form an initial blow opening in the glass at said open end of the mold, withdrawing the parison endwise from the mold through said open end, introducing the parison lengthwise into a finishing mold through an open end of the latter, and applying air under pressure within said initial blow opening and thereby blowing the parison in the finishing mold.

32. The method of forming a hollow glass article which comprises introducing a charge of molten glass into a parison mold through an open end thereof, extending the mold cavity and causing a portion of the charge to enter said extension and reshape the charge to form an initial blow opening in the glass at said open end of the mold, withdrawing the parison endwise from the mold through said open end, introducing the parison lengthwise into a finishing mold through an open end of the latter, applying air under pressure within said initial blow opening and thereby blowing the parison in the finishing mold, cracking off the open end of the blown article, and fire finishing the remaining rim of the article.

33. A machine for forming hollow glass articles comprising a parison mold movable about a column inclined to the vertical, means for introducing a charge of plastic glass into said parison mold, a pressing plunger movable along an axis inclined to the vertical, means to operate said plunger to form a glass parison from said charge, and a finishing mold to form a glass article from said parison.

34. A machine for forming hollow glass articles comprising a parison mold movable about a column inclined to the vertical, means for introducing a charge of plastic glass into said parison mold, a pressing plunger movable along an axis inclined to the vertical, means to operate said plunger to form a glass parison from said charge, parison transfer mechanism movable about a column inclined to the vertical, and a finishing mold to form a glass article from said parison.

35. A machine for forming hollow glass articles comprising a parison mold, means for delivering a charge of plastic glass to said mold while it is vertically disposed, a pressing plunger coacting with said parison mold to form a glass parison, means to operate said plunger while said parison mold is non-vertically disposed, and a finishing mold for forming a glass article from said parison.

36. A machine for forming hollow glass articles comprising a parison mold, means for delivering a charge of plastic glass to said mold while it is vertically disposed, a pressing plunger coacting with said parison mold, means to operate said plunger to form a glass parison, means for delivering said glass parison from said parison mold while it is non-vertically disposed, and a finishing mold for forming a glass article from said parison.

37. A machine for forming hollow glass articles comprising a parison mold, means for delivering a charge of plastic glass to said parison mold while it is vertically disposed, a pressing plunger coacting with said parison mold, means to operate said plunger to form a glass parison, means for delivering said glass parison from said parison mold while it is non-vertically disposed, and a vertically disposed finishing mold for forming a glass article from said parison.

38. A machine for forming hollow glass articles comprising a parison mold, means for bringing the mold successively to a charging station, a pressing station and a transfer station, means for delivering a charge of glass at said charging station, means for forming a glass parison from said charge at said pressing station, means for removing said parison at said transfer station, and a finishing mold for forming a glass article from said parison, the angle of inclination to the vertical of said parison mold varying at the charging, pressing and transfer stations.

39. A machine for forming hollow glass articles comprising a parison mold, means for bringing the mold successively to a charging station, a pressing station and a transfer station, means for delivering a charge of glass at said charging station, means for forming a glass parison from said charge at said pressing station, means for removing said parison at said transfer station, and a finishing mold for forming a glass article from said parison, the angle of inclination to the vertical of said parison mold varying at the charging and pressing stations.

40. A machine for forming hollow glass articles comprising a parison mold, means for bringing the mold successively to a charging station, a pressing station and a transfer station, means for delivering a charge of plastic glass to said parison mold at said charging station, means for forming a glass parison from said charge at said pressing station, means for removing said parison at said transfer station, and a finishing mold for forming a glass article from said parison, the angle of inclination to the vertical of said parison mold varying at the charging and transfer stations.

41. A machine for forming hollow glass articles comprising a parison mold, means for bringing the mold successively to a charging station, a pressing station and a transfer station, means for delivering a charge of plastic glass to said parison mold at said charging station, means for forming a glass parison from said charge at said pressing station, means for removing said parison at said transfer station, and a finishing mold for forming a glass article from said parison, the angle of inclination to the vertical of said parison mold varying at the pressing and transfer stations.

42. A machine for forming hollow glass articles comprising means for drawing glass upwardly by suction from a mass of molten glass and molding it to form a parison, a finishing mold, means for transferring the parison to a position over the finishing mold and inverting the parison during its transfer, means for lowering the parison into the finishing mold, and means for expanding the parison in the finishing mold.

43. A machine for forming hollow glass articles comprising a mold carriage, a parison mold thereon, a column inclined to the vertical about which the mold carriage is rotated to bring the mold to a charging station, a pressing station and a transfer station in succession, means for delivering a charge of plastic glass to the mold at said charging station, means cooperating with the mold for forming a glass parison therein at said pressing station, means for delivery of said parison at said transfer station while the parison mold is inclined to the vertical at twice the angle of inclination of said column, and a finishing mold for forming a glass article from said parison.

44. A machine for forming hollow glass articles comprising a parison mold, a column, means for rotating said mold about the column and thereby bringing it to a charging station and a pressing station in succession, means for delivering a charge of plastic glass to the mold at the charging station, a plunger at the pressing station, the axis of said plunger being inclined to the vertical, said plunger being operable in cooperation with the mold to form a glass parison from said charge, means for transferring said parison to a finishing mold, and means for forming a glass article in said finishing mold from said parison.

45. A machine for forming hollow glass articles comprising a parison mold, a column, means for rotating said mold about the column and thereby bringing it to a charging station and a pressing station in succession, means for delivering a charge of plastic glass to the mold at the charging station, a plunger at the pressing station, the axis of said plunger being inclined to the vertical and lying in a vertical plane including the axis of said column, means to operate said plunger and cause it to cooperate with the mold to form a glass parison from said charge, means for transferring said parison to a finishing mold, and means for forming a glass article in said finishing mold from said parison.

46. A machine for forming hollow glass articles comprising a column, a parison mold, means for moving the mold about said column and thereby bringing it to a charging station and to a pressing station in succession, means for delivering a charge of plastic glass to the mold while at the charging station, means located at the pressing station and cooperating with the mold to form a glass parison from said charge, a finishing mold, means for transferring the parison from the parison mold to the finishing mold, a second column, mechanism for rotating said transfer means about said second column, and means cooperating with the finishing mold for forming a glass article from said parison, said columns both being inclined to the vertical and at the same angle of inclination.

47. A machine for forming hollow glass articles comprising a column, a parison mold, means for moving the mold about said column and thereby bringing it to a charging station and to a pressing station in succession, means for delivering a charge of plastic glass to the mold at the charging station, means located at the pressing station and cooperating with the mold to form a glass parison from said charge, a finishing mold, means for transferring the parison from the parison mold to the finishing mold, a second column, mechanism for rotating said transfer means about said second column, and means cooperating with the finishing mold for forming a glass article from said parison, the axis of said columns being inclined to the vertical and in the same vertical plane.

48. A machine for forming hollow glass articles comprising a column, a parison mold, means for moving the mold about said column and thereby bringing it to a charging station and to a pressing station in succession, means for delivering a charge of plastic glass to the mold at the charging station, means located at the pressing station and cooperating with the mold to form a glass parison from said charge, a finishing mold, means for transferring the parison from the parison mold to the finishing mold, a second column, mechanism for rotating said transfer means about said second column, means cooperating with the finishing mold for forming a glass article from said parison, and a column about which said finishing mold is moved, the axes of said parison mold column and transfer means column and finishing mold column being in the same vertical plane but non-parallel.

ALBERT N. CRAMER.